(No Model.)

W. A. McCOLLOUGH.
GEARING.

No. 586,614.  Patented July 20, 1897.

Witnesses
Jos. Gregory
A. A. Nau

Inventor,
William A. McCollough
by John Wedderburn
Attorney

UNITED STATES PATENT OFFICE.

WILLIAM A. McCOLLOUGH, OF PASADENA, CALIFORNIA.

GEARING.

SPECIFICATION forming part of Letters Patent No. 586,614, dated July 20, 1897.

Application filed June 27, 1896. Serial No. 597,170. (No model.)

*To all whom it may concern:*

Be it known that I, WILLIAM A. MCCOLLOUGH, a citizen of the United States, residing at Pasadena, in the county of Los Angeles and State of California, have invented certain new and useful Improvements in Gearings; and I do hereby declare the following to be a full, clear, and exact description of the invention, such as will enable others skilled in the art to which it appertains to make and use the same.

My invention relates to mechanical movements, and more particularly to an improved form of gearing for transforming rotary motion into oscillating and reciprocating motion, or vice versa, whereby advantageous and highly-superior results are attained.

The invention consists of certain improved features and combinations, all of which will appear hereinafter.

Figure 1:
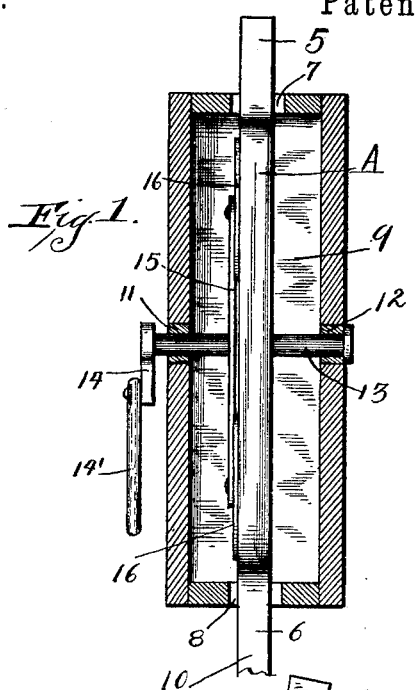
Figure 2:
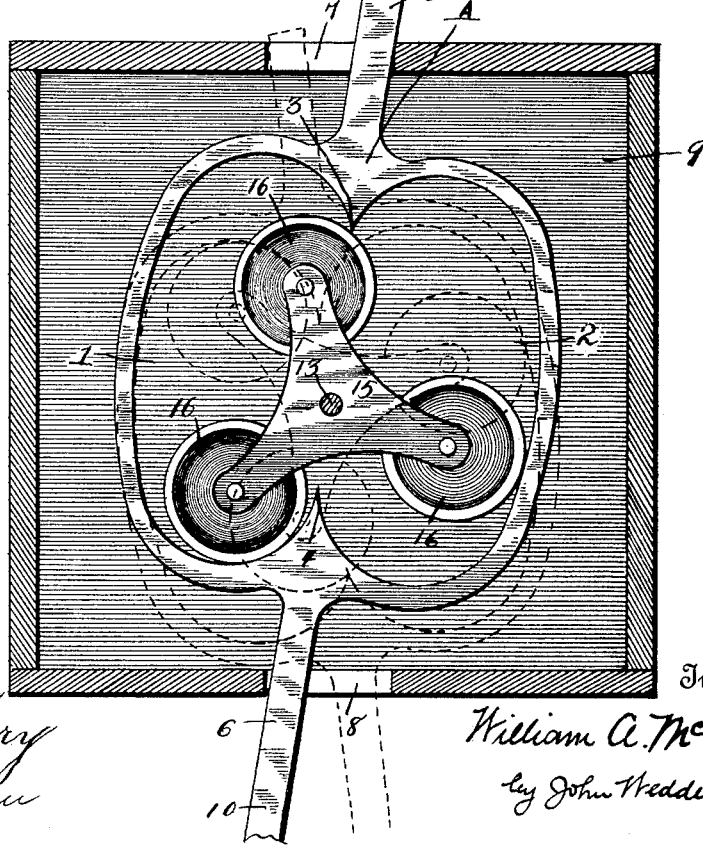

In the accompanying drawings, Figure 1 is a partially-sectional plan view; and Fig. 2, a side elevation, partially in section.

A represents a longitudinally-double open cam-rim. This rim is of such contour that two ellipses 1 and 2, having their adjacent sides coinciding, are formed, thereby providing opposite cam projections 3 and 4. In general the result of this construction is the provision of a cam-surface having the outline of a figure 8.

Two guide-bars 5 and 6 are situated to lie in a line coinciding with one drawn between the cam projections. Both of these guide-bars are adapted for vertical movement in slots 7 and 8, formed in the ends of an inclosing frame or box 9, and one of the guide-bars is extended to form a driving-rod 10, adapted for connection to any rotary body.

The inclosing box or frame 9 must be somewhat longer and higher than the cam-rim to give the latter room for vertical and horizontal play. Suitable bearings 11 and 12 are also provided in said frame and receive a transverse shaft 13, provided with a suitable crank 14, to which may be connected a driving-pitman 14', as shown in the drawings. This transverse shaft carries a substantially triangular cam 15, provided with wheels 16, preferably situated equidistant from each other.

The wheels of the cam are adapted to ride on the cam-surface of the cam-rim and to support the latter, as shown.

The relation of the parts is such that as the cam is rotated the wheels carried thereby are successively brought into engagement with the cam projections on the cam-rim and impart to the latter a reciprocating rectilinear motion by alternately pushing on one of the cam projections and then passing on and lifting the cam-rim. It is evident, therefore, that for each revolution of the cam 15 six half-reciprocations or three complete strokes will be imparted to the cam-rim.

The invention operates smoothly and evenly, as one of the wheels of the cam is always in contact with the cam-rim and the friction is quite small.

My invention may be used to great advantage in connection with windmills, pumps, and other machinery where it is desirable to transform rotary motion into multiplied oscillating and reciprocating motion.

It is obvious that slight changes and additions might be resorted to without materially affecting the spirit and scope of the invention, and I do not therefore limit myself to the precise construction herein shown and described.

Having thus described the invention, what is claimed as new is—

In a mechanical movement, the combination with an outer frame or casing having vertically-extending slots, of a longitudinally-double open cam-rim each side of which is provided with an elliptical cam-surface, and said rim having opposite cam projections, and guide-rods connected to the rim on opposite sides thereof and extending loosely through the slots in the casing so that they will be free for vertical movement in said slots, of a rotary device carried on a shaft journaled in said casing and having arms, and wheels journaled to the arms and adapted to ride on the cam-surfaces, and cam projections whereby a combined oscillating and reciprocating motion is imparted to the cam-rim.

In testimony whereof I have signed this specification in the presence of two subscribing witnesses.

WILLIAM A. McCOLLOUGH.

Witnesses:
C. U. BUNNELL,
ANN E. DEAN.